(12) United States Patent
Akiba et al.

(10) Patent No.: US 11,181,228 B2
(45) Date of Patent: Nov. 23, 2021

(54) ROD FIXING DEVICE, AND TELESCOPIC ROD UNIT EMPLOYING SAME

(71) Applicant: TOK, INC., Tokyo (JP)

(72) Inventors: Junichiro Akiba, Tokyo (JP); Shin Kimura, Tokyo (JP)

(73) Assignee: TOK, Inc., Tokyo (JP)

( * ) Notice: Subject to any disclaimer, the term of this patent is extended or adjusted under 35 U.S.C. 154(b) by 0 days.

(21) Appl. No.: 16/771,423

(22) PCT Filed: Dec. 7, 2018

(86) PCT No.: PCT/JP2018/045104
§ 371 (c)(1),
(2) Date: Jun. 10, 2020

(87) PCT Pub. No.: WO2019/131063
PCT Pub. Date: Jul. 4, 2019

(65) Prior Publication Data
US 2021/0180747 A1   Jun. 17, 2021

(30) Foreign Application Priority Data
Dec. 26, 2017   (JP) .............................. JP2017-248686

(51) Int. Cl.
*F16M 11/28*  (2006.01)
*F16B 7/14*  (2006.01)

(52) U.S. Cl.
CPC ............... *F16M 11/28* (2013.01); *F16B 7/14* (2013.01); *F16M 2200/027* (2013.01)

(58) Field of Classification Search
CPC ...... F16M 11/28; F16M 2200/027; F16B 7/14
See application file for complete search history.

(56) References Cited

U.S. PATENT DOCUMENTS 1,919,114 A * 7/1933 Ley .......................... F21S 6/006
                                                         403/112
2,884,270 A * 4/1959 Carlberg ............... F16L 37/248
                                                         403/104
(Continued)

FOREIGN PATENT DOCUMENTS

JP    S53-021263    2/1978
JP    S54-072258    5/1979
(Continued)

OTHER PUBLICATIONS

International Search Report for corresponding International Application No. PCT/JP2018/045104, dated Mar. 5, 2019; 2 pages.

*Primary Examiner* — Anita M King
(74) *Attorney, Agent, or Firm* — Fattibene and Fattibene LLC; Paul A. Fattibene (57) ABSTRACT

Rod fixing device with the same force irrespective of whether movement of a rod is up or down. A locking mechanism moves with a first rod inside a second rod and a stopper having a contacting surface portion contacting an inner circumferential surface of the second rod. A holder which rotatably holds the stopper so that the contacting surface portion contacts the inner circumferential surface of the second rod, and a spring imparts the stopper with a forces generating a fixing frictional force between the first rod and the second rod by causing the contacting surface portion to come into contact with the inner circumferential surface of the second rod. Movement of the first rod toward one side causes the contacting surface portion to rotate toward a side separating from the inner circumferential surface of the second rod, and movement of the first rod toward the other side is a movement against the fixing frictional force.

9 Claims, 9 Drawing Sheets

(56) References Cited

U.S. PATENT DOCUMENTS

| | | | | | |
|---|---|---|---|---|---|
| 2,952,485 | A | * | 9/1960 | Hammond | A47B 19/002 403/105 |
| 5,595,410 | A | * | 1/1997 | Wilson | E05C 19/008 292/259 R |
| 7,086,631 | B2 | * | 8/2006 | Lee | F16M 11/26 248/161 |

FOREIGN PATENT DOCUMENTS

| JP | S52-001330 | 1/1997 |
|---|---|---|
| JP | 2016001010 | 1/2016 |

\* cited by examiner

ROD FIXING DEVICE, AND TELESCOPIC ROD UNIT EMPLOYING SAME

TECHNICAL FIELD

The present invention relates to a rod fixing device and a telescopic rod unit using the same, and, in particular, to a rod fixing device suitable used when an unexpected movement of a rod is restricted and a telescopic rod unit using the same.

BACKGROUND ART

A columnar support for an article for daily use such as a mirror, a columnar support for furniture, an interior, or the like, a columnar support for medical apparatus such as a hospital drip stand, or a columnar support for acoustic equipment such as a microphone stand may use a telescopic rod unit in which two rods telescopically coupled to each other to change the lengths and the heights of the rods. The telescopic rod unit in which two rods are telescopic has a structure in which a small-diameter moving rod is inserted into a through hole of a large-diameter pipe-shaped fixed rod and the moving rod can be moved along a longitudinal direction of the fixed rod. In addition, the telescopic rod unit includes a rod fixing device which switches between a state in which a fixed rod and a moving rod can be relatively moved and a state (lock state) in which the fixed rod and the moving rod are fixed to each other (for example, see Patent Literature 1).

In Patent Literature 1, a rod fixing device includes a bearing into which a moving rod is inserted, two brakes arranged in parallel with each other in the circumferential direction of the moving rod and biased to press the outer peripheral surface of the moving rod, and two cancel switches disposed for the two brakes, respectively and moving the corresponding brakes in a direction away from the moving rod. When the lock of the rod fixing device is canceled, the lock is released when the two cancel switches are simultaneously pressed inwardly so that the moving rod can be moved with respect to a fixed rod.

CONVENTIONAL ART LITERATURE

Patent Literature

[Patent Literature 1] Japanese Published Unexamined Application No. 2016-1010

SUMMARY OF THE INVENTION

Problem to be Solved by the Invention

An invention described in Patent Literature 1 has poor operability disadvantageously because two cancel switches must be simultaneously pressed when the lock of a rod fixing device is released.

A telescopic direction is a vertical direction, and an installation is attached on a moving rod side. In this state, when the moving rod is moved downward, the weights of the moving rod and the installation act as a force moving the moving rod downward, and the moving rod can be easily moved downward by a light force. In contrast to this, when the moving rod is moved upward (lifted up), the weight of the installation and the weight of the moving rod are added to each other, and the added weight serves as a force lifting up the moving rod. For this reason, the moving rod must be lifted up with a relatively large force. Thus, a difference between an operating force used when the moving rod is moved upward and an operating force used when the moving rod is moved downward becomes large, and an uncomfortable feeling in an operation of moving the moving rod upward or downward occurs disadvantageously.

Therefore, a technical problem to be solved is to provide a rod fixing device which can be operated with substantially the same magnitude of force irrespective of whether the direction of movement of a rod is up or down and a telescopic rod unit using the rod fixing device is posed, and the present invention has as its object to solve the problem.

Means for Solving the Problem

The present invention is proposed to achieve the above object, the invention described in an embodiment provides a rod fixing device suppressing a rod from unexpectedly moving, including: a first rod, a cylindrical second rod into which the first rod is inserted and which holds the first rod such that the first rod can be reciprocally moved in axial directions; and a locking mechanism which moves together with the first rod in the axial directions in the second rod, wherein the locking mechanism includes at least one stopper having a contacting surface portion capable of coming into contact with an inner circumferential surface of the second rod, a holder which is arranged in the second rod such that the holder can be moved together with the first rod and which rotatably holds the stopper in such a way that the contacting surface portion is capable of coming into contact with the inner circumferential surface of the second rod, and an elastic member which gives to the stopper an elastic force for generating a fixing frictional force between the first rod and the second rod by causing the contacting surface portion of the stopper to come into contact with the inner circumferential surface of the second rod, the stopper, when the first rod moves to one side in the axial directions, is interlocked and rotated such that the contacting surface portion comes away from the inner circumferential surface of the second rod and, when the first rod moves to the other side in the axial directions, is moved against the fixing frictional force.

According to the configuration, a case in which the rod fixing device is vertically arranged will be described. (1) At ordinary times, with the elastic force of the elastic member, the contacting surface portion of the stopper is pressure-bonded to the inner circumferential surface of the second rod. In this manner, a fixing frictional force is generated between the contacting surface portion of the stopper and the second rod, and, with the fixing frictional force, the first rod can be suppressed (locked) from being moved from the second rod. (2) When a downward force is applied to the first rod downward in the state in which the movement is suppressed, the first rod is moved downward against the fixing frictional force. (3) In contrast to this, an upward force is applied to the first rod side, the stopper is rotated on the side on which the contacting surface portion of the stopper comes away from the inner circumferential surface of the second rod, and the fixing frictional force is attenuated. In the state in which the fixing frictional force is attenuated, the first rod side is lifted up, and the first rod can be moved upward with a force substantially close to the weight (when an installation is present on the first rod side, the weight of the first rod and the installation) on the first rod side.

Thus, when the fixing frictional force is set to substantially the same weight on the first rod or a force slightly larger than the weight, a movement to the first lock side can be suppressed with the fixing frictional force at ordinary times. When a downward force is applied to the first rod in the suppression state, the first rod can be moved downward with a force substantially equal to the weight on the first rod side. In contradiction to this, when an upward force is applied to the first rod in the suppression state, the first rod side can be moved upward with a force substantially equal to the weight on the first rod side. In this manner, an operation can be performed with substantially the same magnitude of force irrespective of whether the direction of movement of a rod is up or down, and an operation of moving the first rod upward/downward is comfortably performed.

The invention described in another embodiment, in the configuration described in a prior embodiment, provides a rod fixing device in which as the stopper, one pair of stoppers are arranged at positions almost symmetrical to the elastic member.

With the configuration, the pair of stoppers are used, and the elastic member is commonly arranged between the pair of stoppers to horizontally equally apply a fixing frictional force given from the elastic force to the stoppers to the second rod, and the first rod can be stably suppressed from being moved with respect to the second rod. Also, in an operation for moving the first rod upward/downward, the pair of stoppers come into contact with the inner circumferential surface of the second rod, and an upward/downward movement can be guided in a state in which the first rod is held at an axial center. Furthermore, since the elastic member is commonly arranged between the pair of stoppers, the invention can be achieved without increasing the number of elastic members.

The invention described in another embodiment, in the configuration described in prior embodiments, provides a rod fixing device in which a positioning pin is disposed on one of the holder and the stopper, and a guide groove in which the positioning pin is engaged with the other of the holder and the stopper such that the positioning pin can be slid in the radial direction of the second rod.

With the configuration, depending on the shape of the guide groove, the axis of the stopper can be changed, and, by changing the position of the axis of the stopper, in a lock state of the stopper with respect to the second rod at ordinary times and when the first rod is moved upward or downward, an attenuation of the fixing frictional force can be easily adjusted. In addition, since the axis of the stopper can move in the guide groove, the rod fixing device can normally operated even though the internal diameter of the second rod has some variations.

The invention described in another embodiment, in the configuration described in prior embodiments, provides a rod fixing device in which a shoulder portion of the stopper facing the second rod is formed in a convex curved shape.

With the configuration, the shape of the shoulder portion of the stopper facing the second rod is made into a convex curved shape to prevent the stopper from coming into the inner surface of the second rod, and an operation rotating the stopper in the radial direction side of the second rod is smoothly performed.

The invention described in another embodiment, in the configuration described in prior embodiments, provides a rod fixing device in which the stopper has the contacting surface portion to which a brake member is attached.

With the configuration, the brake member attached to the contacting surface portion can freely adjust the fixing frictional force.

The invention described in another embodiment, in the configuration described in prior embodiments, provides a rod fixing device in which the holder is attached to the first rod through a bracket.

With the configuration, the holder is attached to the first rod through the bracket to make it possible to strongly fix the holder to the first rod.

The invention described in another embodiment provides a telescopic rod unit including the rod fixing device according to any one of the prior embodiments, a movable-side member integrated with the first rod, and a fixed-side member integrated with the second rod.

With the configuration, the telescopic rod unit which can perform a moving operation of the rod with substantially the same magnitude of force irrespective of whether the direction of movement of the first rod is an extension direction or a contraction direction.

The invention described in another embodiment provides a telescopic rod unit in which the movable-side member is a makeup mirror and the fixed-side member is an installation table.

With the configuration, the height position of the makeup mirror disposed on the installation table can be moved upward or downward, and a telescopic rod unit with a makeup mirror which can be comfortably operated is obtained.

Advantages

In the invention, when the fixing frictional force is set to a force substantially equal to a weight on the first rod side or a force slightly larger than the weight, movement on the first lock side is suppressed (locked) with the fixing frictional force at ordinary times, and, when a downward force is applied to the first lock in a state in which the movement is suppressed, the first rod can be moved downward with a force substantially equal to the fixing frictional force. In contrast to this, when an upward force is applied to the first rod, the first rod side can be moved upward with a force substantially equal to the weight on the first rod side. For this reason, the operation can be performed with substantially the same magnitude of force irrespective of whether the direction of movement of the first rod is up or down, and the operation of moving the first rod upward/downward is comfortably performed.

BRIEF DESCRIPTION OF THE DRAWINGS

FIGS. 1A and 1B are front views of a rod fixing device according to the present invention and a makeup mirror stand using a telescopic rod unit, in which FIG. 1A is a view showing an extension state and FIG. 1B is a view showing a contraction state.

FIGS. 2A and 2B are side views of a rod fixing device according to the present invention and a makeup mirror stand using a telescopic rod unit, in which FIG. 2A is a view showing an extension state and FIG. 2B is a view showing a contraction state.

FIG. 7 is a plan view of the holder when viewed from the direction of an arrow D in

FIG. 6.

FIGS. 15A to 15C are operation explanation diagrams of the rod fixing device, in which FIG. 15A shows a locking state, FIG. 15B shows a state in which a first rod is moved upward, and FIG. 15C shows a state in which the first rod is moved downward.

MODE FOR CARRYING OUT THE INVENTION

In order to achieve a purpose of providing a rod fixing device which can be operated with substantially the same magnitude of force irrespective of whether the direction of movement of a rod is up or down and a telescopic rod unit using the rod fixing device, there is provided a rod fixing device which suppresses an unexpected movement of a rod including: a first rod, a cylindrical second rod into which the first rod is inserted and which holds the first rod such that the first rod can be reciprocally moved in axial directions and a locking mechanism which moves integrally with the first rod in the axial directions in the second rod, wherein the locking mechanism has at least one stopper having a contacting surface portion which can come into contact with an inner circumferential surface of the second rod, a holder which is disposed in the second rod such that the first rod can move together with the first rod and which rotatably holds the stopper such that the contacting surface portion can come into contact with the inner circumferential portion of the second rod, and an elastic member which gives an elastic force to generate a fixing frictional force between the first rod and the second rod to the stopper by causing the contacting surface portion of the stopper to come into contact with the inner circumferential surface of the second rod, and the stopper, when the first rod moves to one side in the axial directions, is rotated such that the contacting surface portion comes away from the inner circumferential surface of the second rod and moves against the fixing frictional force when the first rod moves to the other side in the axial directions.

A mode for carrying out the present invention will be described below in detail with reference to the accompanying drawings. In the following explanation, the same reference symbols throughout the entire explanation of the embodiment denote the same elements as in the explanation. In the following explanation, expressions indicating the directions such as upward, downward, left, and right directions are not absolute, but are proper in an attitude in which the parts of the rod fixing device according to the present invention are drawn. However, when the attitude changes, the directions must be interpreted to be changed depending on the change of the attitude.

EMBODIMENT

Figure 1A:
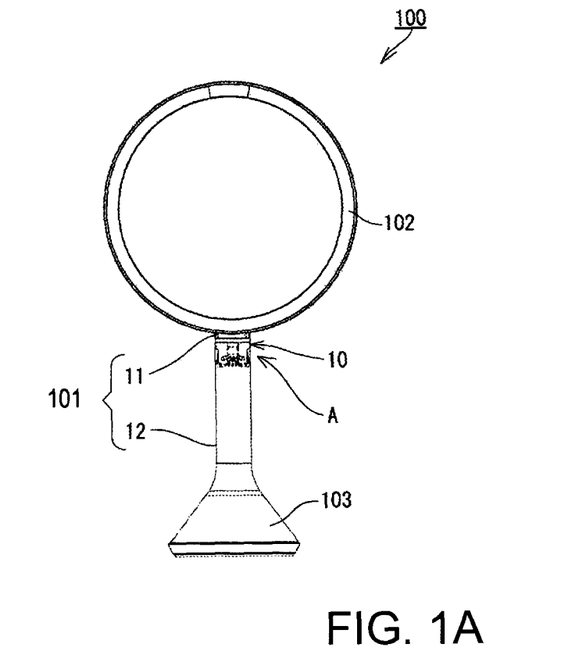
Figure 1B:
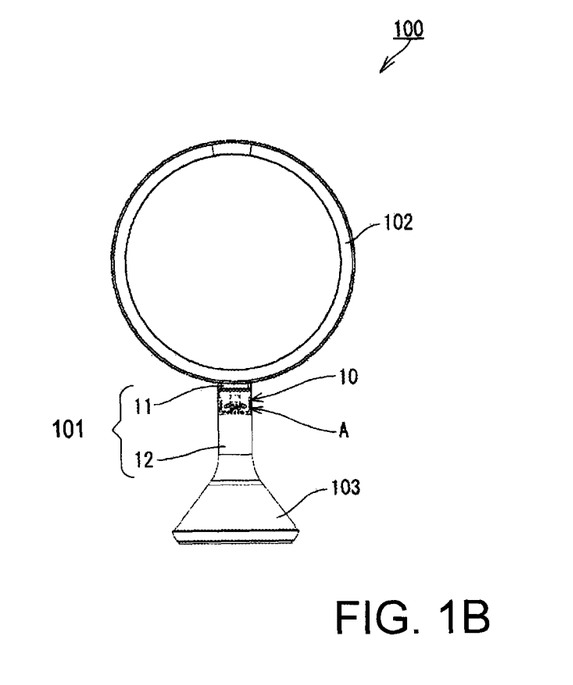
Figure 2A:
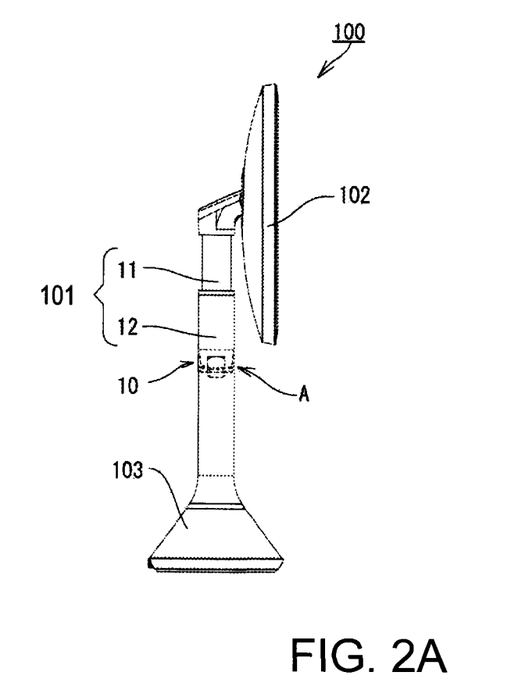
Figure 2B:
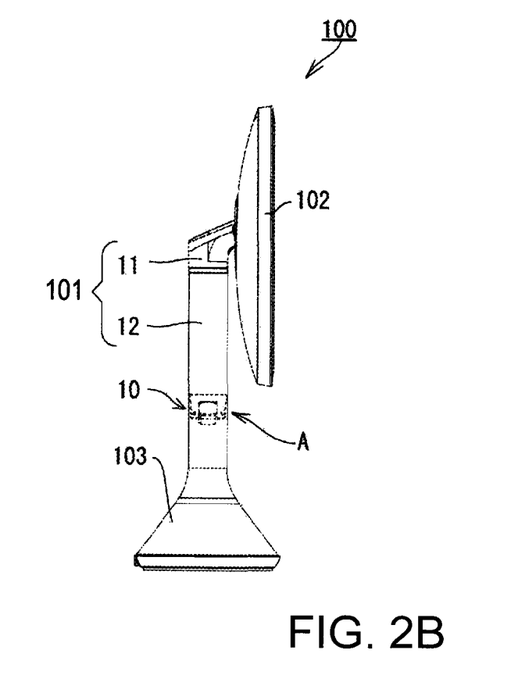

FIGS. 1A and 1B and FIGS. 2A and 2B show a rod fixing device 10 according to the present invention and a makeup mirror stand 100 serving as an example a product using a telescopic rod unit 101. FIGS. 1A and 1B are front views of the makeup mirror stand 100, and FIGS. 2A and 2B are side views of the makeup mirror stand 100.

In FIGS. 1A and 1B and FIGS. 2A and 2B, the makeup mirror stand 100 includes the telescopic rod unit 101 which has a columnar-bar-like first rod 11 serving as a movable-side member and a pipe-like second rod 12 serving as a fixed-side member and in which the first rod 11 is disposed in the cylinder of the second rod 12 such that the first rod 11 can be slid in axial directions. In the telescopic rod unit 101, a makeup mirror 102 is attached to the upper end side of the first rod 11, and an installation table 103 is attached to the lower end side of the second rod 12, so that the installation table 103 can be installed at a necessary position on a table or the like.

In the telescopic rod unit 101, the first rod 11 and the second rod 12 are movably coupled to each other in the axial directions, and, between the first rod 11 and the second rod 12, the rod fixing device 10 which suppresses the movements of the first rod 11 and the second rod 12 to set in a stop state (locking state) is incorporated in a part A in FIGS. 1A and 1B and FIGS. 2A and 2B. In the makeup mirror stand 100, the installation table 103 is fixed (installed) on the table or the like (not shown). When the makeup mirror 102 is gripped with a hand and lifted up, in the telescopic rod unit 101, the first rod 11 is lifted up with respect to the second rod 12 and moves, and the movement can cause the position of the makeup mirror 102 to move upward. In contrast to this, when the makeup mirror 102 is pressed downward, the first rod 11 is slidably pushed into the second rod 12, and the position of the makeup mirror 102 can be moved downward. Upon completion of position adjustment of the makeup mirror 102, when the hand is unlinked from the makeup mirror 102, the rod fixing device 10 incorporated in the telescopic rod unit 101 suppresses a movement between the first rod 11 and the second rod 12 to set a locking state, and the makeup mirror 102 can be held at the position.

Figure 3:
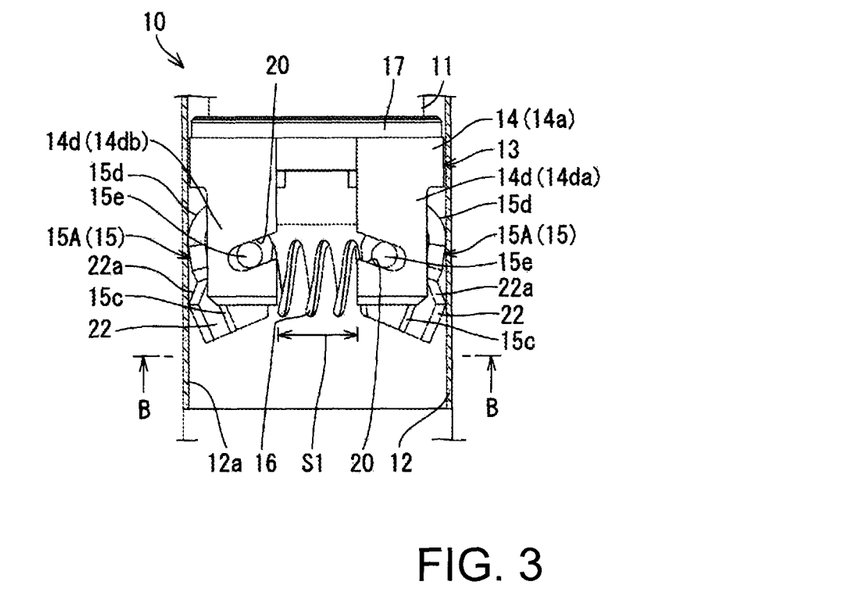
FIG. 3 is a front view of the rod fixing device in the same viewpoint as that of a structure in a part A in FIG. 1A.
Figure 4:
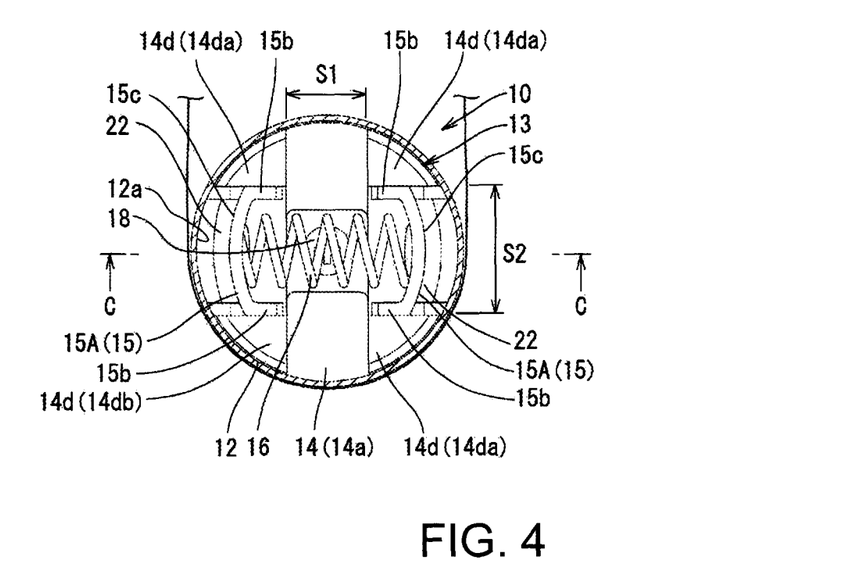
FIG. 4 is a schematic view when viewed from an arrow direction of a section along a B-B line in FIG. 3.
Figure 5:
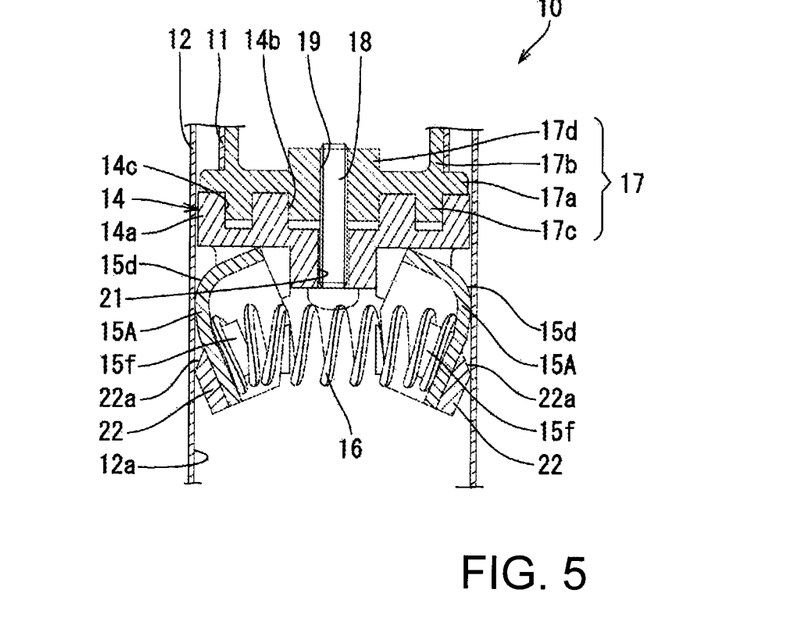
FIG. 5 is a schematic view when viewed from an arrow direction of a section along a C-C line in FIG. 4.
Figure 6:
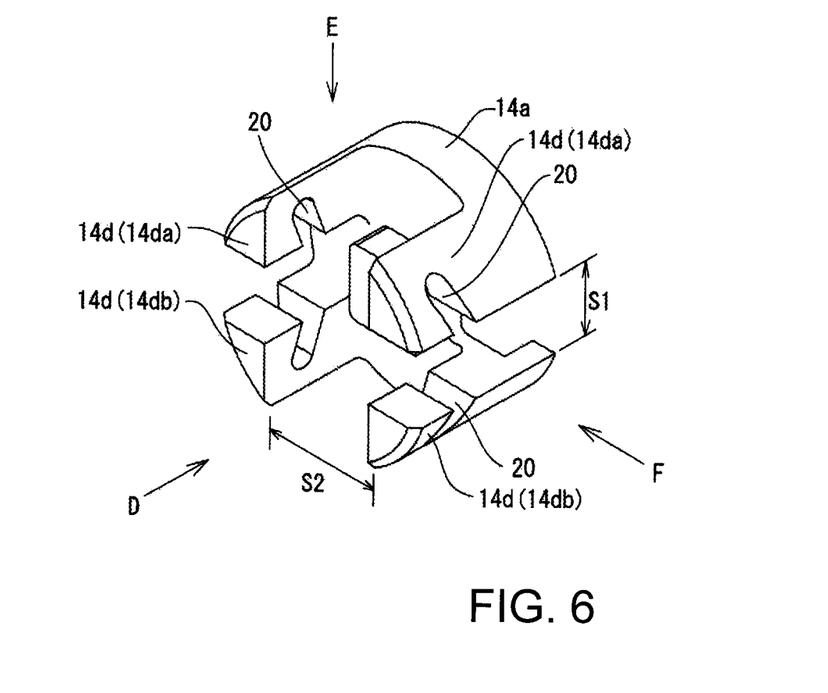
FIG. 6 is a perspective view of a holder in the rod fixing device.
Figure 7:
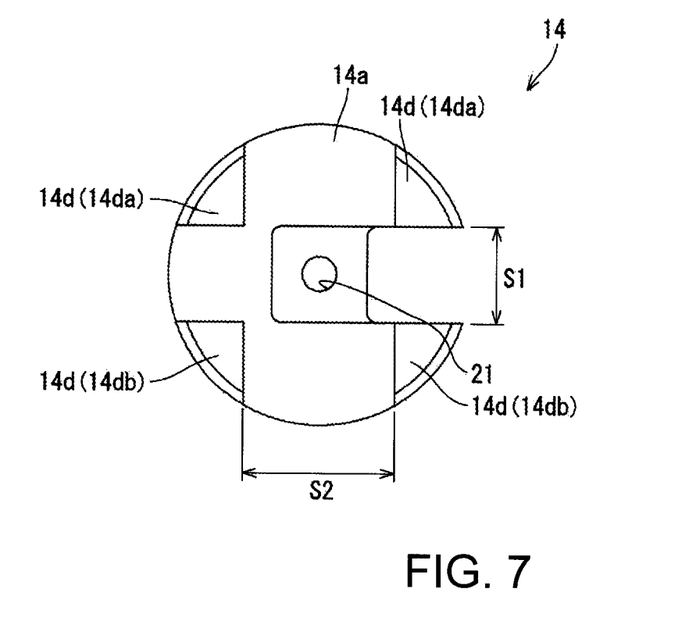
Figure 8:
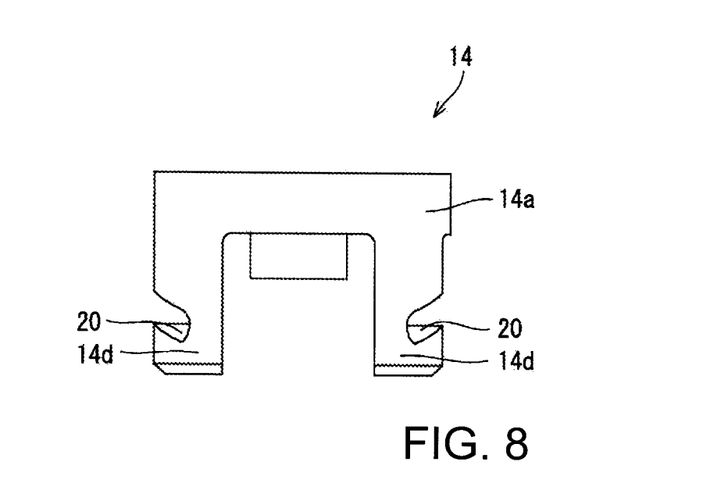
FIG. 8 is a side view of the holder when viewed from the direction of an arrow E in FIG. 6.
Figure 15A:
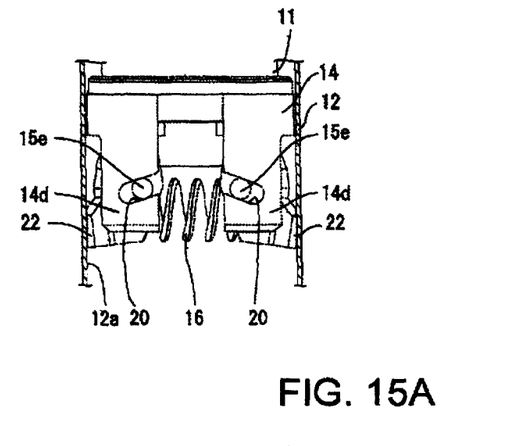
Figure 15B:
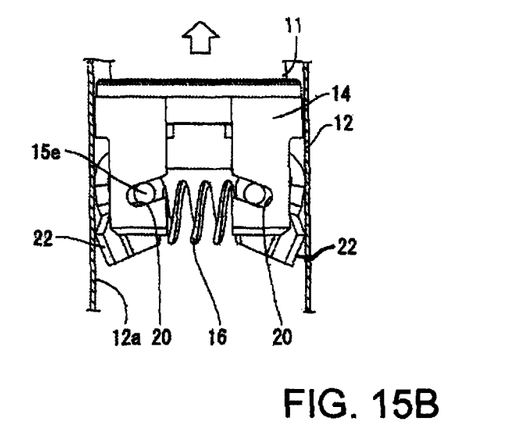
Figure 15C:
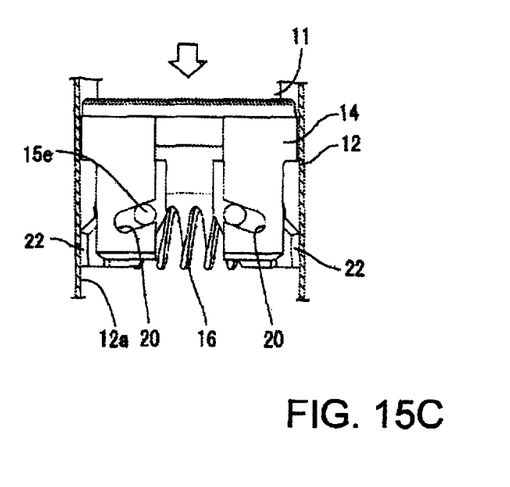

FIG. 3 to FIG. 5 are views for explaining the structure of the rod fixing device 10, FIG. 3 is a front view of the rod fixing device 10 in the same viewpoint as that of the structure in a part A in FIG. 1A, FIG. 4 is a schematic view when viewed from an arrow direction of a section along a B-B line in FIG. 3, and FIG. 5 is a schematic view when viewed from an arrow direction of a section along a C-C line in FIG. 4. FIG. 6 to FIG. 10 are views showing a holder 14 of the rod fixing device 10, FIG. 11 to FIG. 14 are views showing a stopper 15 of the rod fixing device 10, and FIGS. 15A to 15C are operation explanation diagrams of the rod fixing device 10.

The structure of the rod fixing device 10 will be described by using FIG. 3 to FIG. 15C. The rod fixing device 10 includes the first rod 11, the cylindrical second rod 12, and a locking mechanism 13 which is attached to the lower end side of the first rod 11 and freely inserted in the second rod 12 together with the lower end side of the first rod 11. In the embodiment, the first rod 11 is a cylindrical member like the second rod 12. The outer diameter of the first rod 11 is formed to be smaller than the inner diameter of the second rod 12. Thus, the first rod 11 can be freely reciprocally moved in the second rod 12 along the axial center of the second rod 12.

The locking mechanism 13 includes the holder 14, the stopper 15, a coil spring 16 serving as an elastic member, and a bracket 17 to attach the holder 14 to the lower end of the first rod 11.

The bracket 17 is a substantially-disk-like member made of a resin material, as shown in FIG. 5, integrally has a disk-like portion 17a having an outer diameter larger than the outer diameter of the first rod 11 and smaller than the inner diameter of the second rod 12, an upper-side tube-like portion 17b projecting from the upper surface of the disk-like portion 17a upward, a lower-side tube-like portion 17c projecting from the lower surface of the disk-like portion 17a downward, and a shaft portion 17d formed at the axial center of the disk-like portion 17a. In addition, in the shaft portion 17d, an attaching hole 19 to which a tapping screw 18 is fixed by screwing is formed.

The upper-side tube-like portion 17b of the bracket is formed to have an outer diameter substantially equal to the inner diameter of the first rod 11. The bracket 17 is fixed and attached to the lower end side of the first rod 11 such that the upper-side tube-like portion 17b is press-fitted in the first rod 11 from the lower end side of the first rod 11. Fixing between the first rod 11 and the upper-side tube-like portion 17b uses an adhesive agent, heat fastening, or the like.

The holder 14 is a substantially-short-columnar member having a relatively short height and made of a resin material. The holder 14 has a structure also shown as a single item in FIGS. 6 to 10. With reference to FIG. 3 to FIG. 5, besides FIG. 6 to FIG. 10, the structure of the holder 14 will be described below. The holder 14, as shown in FIG. 5, has a disk-like portion 14a having an outer diameter substantially equal to the outer diameter of the disk-like portion 17a of the bracket 17 and smaller than the inner diameter of the second rod 12. On the upper surface side of the disk-like portion 14a, a concave portion 14b in which the shaft portion 17d of the bracket 17 is fitted and disposed and an annular concave groove 14c are formed. In contrast to this, on the lower surface side of the disk-like portion 14a, as shown in FIG. 3, FIG. 4, FIG. 6, and FIG. 7, one pair of vertical portions 14d are symmetrically arranged with a space S1 vertically from the lower surface to the lower surface of the disk-like portion 14a.

Figure 9:
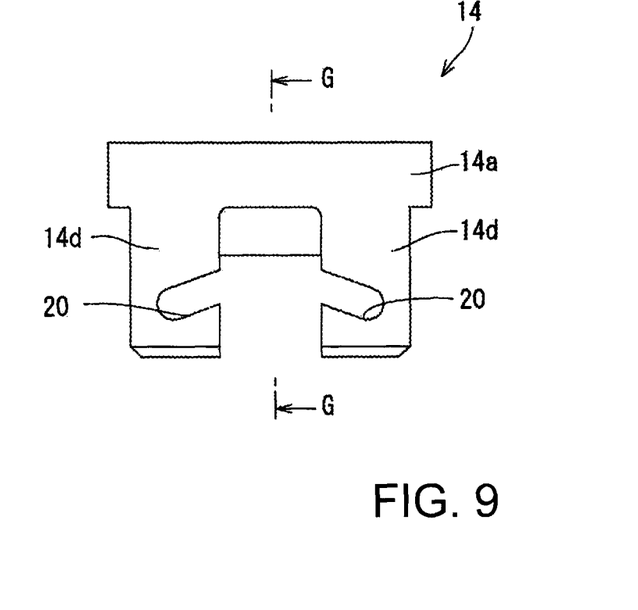
FIG. 9 is a side view of the holder when viewed from the direction of an arrow F in FIG. 6.
Figure 10:
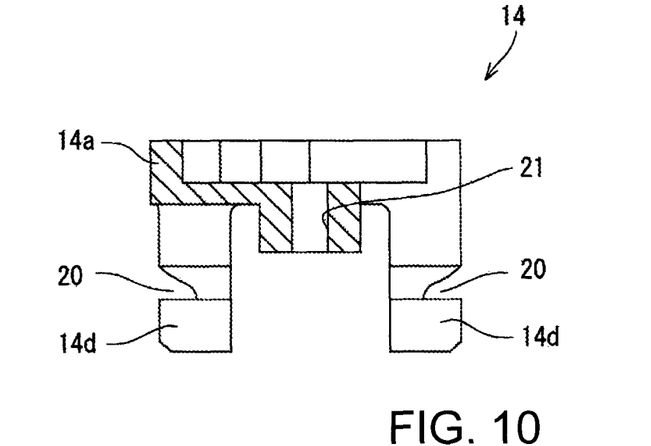
FIG. 10 is a sectional view on arrow along a G-G line in FIG. 9.
Figure 11:
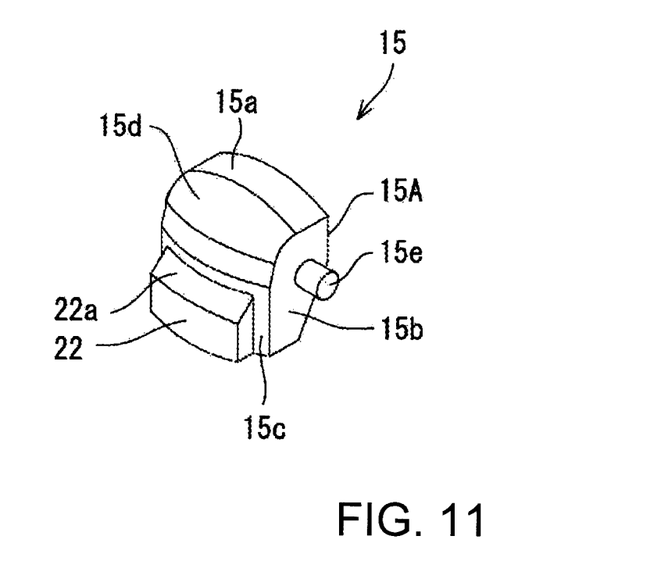
FIG. 11 is a perspective view of a stopper in the rod fixing device when viewed from an outside direction of the rod fixing device.
Figure 12:
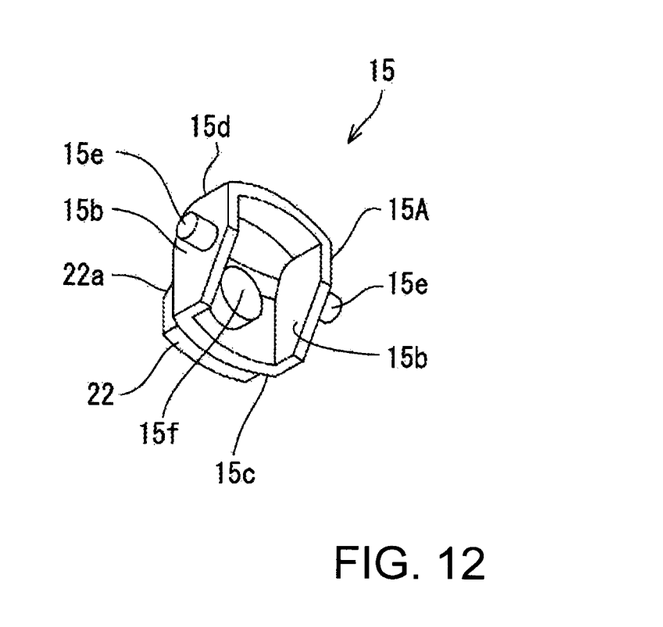
FIG. 12 is a perspective view of the stopper in the rod fixing device when viewed from an inside direction of the rod fixing device.
Figure 13:
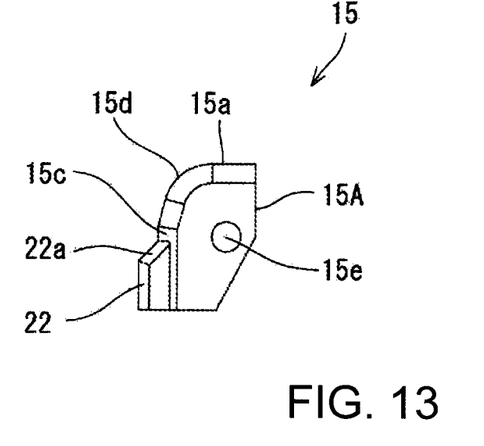
FIG. 13 is a side view of a stopper in the rod fixing device.
Figure 14:
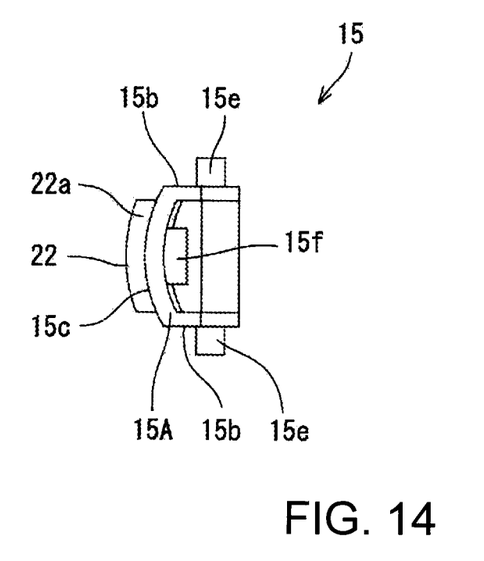
FIG. 14 is a bottom view of the stopper in the rod fixing device.

The pair of vertical portions 14d of the holder 14 are divided into two front and rear vertical legs 14da and 14db to have a space S2 therebetween. In the front and rear vertical legs 14da and 14db, at intermediate positions in the height direction, slits 20 serving as guide grooves are formed, respectively. The slits 20, as shown in FIG. 3 and FIG. 9, are formed to extend from the inside of the space S1 to the outside (on the inner circumferential surface 12a side of the second rod 12) and to be gradually decline from the disk-like portion 14a side to the distal end sides of the vertical legs 14da and 14db when viewed from the side surface.

Furthermore, at the central part of the disk-like portion 14a on the holder 14, an attaching hole 21 through which a screw part of the tapping screw 18 attached from the lower surface side of the disk-like portion 14a is inserted is formed to correspond to the attaching hole 19 of the bracket 17 and to penetrate from the upper and lower surfaces.

The holder 14 is fixed and attached to the lower end side of the first rod 11 through the bracket 17. The holder 14 for the lower end of the first rod 11 is spliced on the bracket 17 such that the lower-side tube-like portion 17c of the bracket 17 attached and fixed to the lower end side of the first rod 11 in advance is fitted and inserted into the annular concave groove 14c and the shaft portion 17d of the bracket 17 is fitted and inserted into the concave portion 14b. The tapping screw 18 is screwed into the attaching hole 19 of the bracket 17 through the attaching hole 21 of the holder 14 from the lower side of the disk-like portion 14a of the holder 14, so that the holder and the bracket 17 are fixed to each other by the tapping screw 18. At this time, the holder 14 can be fixed to the lower end side of the first rod 11 through the bracket 17. FIG. 5 shows the fixing state. An indirect connection between the holder 14 and the first rod 11 by using the bracket 17 is not limited, for example, a direct contact by screwing, a caulking process, an adhesive agent, or the like may be used.

The stopper 15 is a five-sided shaped member made of a resin material, and is formed to have a size which can be stored and arranged in a space S2 of the holder 14. In addition, the stopper 15 exhibits a structure serving as a single item also shown in FIG. 11 to FIG. 14. With reference to FIG. 3 to FIG. 5, besides FIG. 11 to FIG. 14, the structure of the stopper 15 will be described. The stopper 15, as shown in FIG. 4, has a main body portion 15A having a width substantially equal to that of the space S2 between the vertical legs 14da and 14db.

The main body portion 15a has an upper surface portion 15a, front and rear side surface portions 15b, and a contacting surface portion 15c arranged to face the inner surface of the second rod 12, and the lower surface and the inner surface are opened to form a horizontal section having a substantially U shape. In addition, as shown in FIG. 5, on one side (upper side) of the axial directions of the second rod 12, a shoulder portion 15d facing the top surface of the space S2 and the inner circumferential surface of the second rod 12, i.e., the shoulder portion 15d obtained by connecting the upper surface portion 15a and the contacting surface portion 15c is formed into a convex curved shape. When the stopper 15 rotates in the space S2, the shoulder 15d is configured to be able to smoothly rotate without coming into contact with the holder 14 and the second rod.

To the surface of the contacting surface portion 15c in the main body portion 15A, a brake member 22 is attached. The brake member 22 is made of, for example, silicone rubber or the like. The brake member 22 is a member to cause a fixing frictional force to act between the inner circumferential surface 12a of the second rod 12 and the brake member 22 when the first rod 11 moves in the axial directions of the second rod 12 in the state in which the brake member 22 is in contact with the inner circumferential surface 12a of the second rod 12. Note that the brake member 22 may be omitted depending on a fixing frictional force generated when the contacting surface portion 15c comes into contact with the inner circumferential surface 12a of the second rod 12. In addition, a tapered portion 22a inclined from the upper side to the lower side is formed on the upper end side of the brake member 22 to avoid the stopper 15 from being in contact with the inner surface of the second rod 12 when the lower end side of the stopper 15 rotate internally.

In the front and rear side surface portions 15b of the stopper 15, pin-like axes 15e projecting to the outside are formed at front-back-symmetrical positions, respectively. The axes 15e can be slidably and rotatably arranged in the slits 20 formed in the vertical legs 14da and 14db of the holder 14. Furthermore, on the rear surface (surface on the center side of the second rod 12) of the contacting surface portion 15c of the main body portion 15a, a pin-like locking projection 15f to which the end portion of the coil spring 16 is locked is formed.

The stopper 15 is disposed in the space S2 and attached to the holder 14 such that the axes 15e disposed on both the front and rear sides in the space S1 are inserted into and engaged with the corresponding slits 20 from the space S1 side. The stopper 15 can be reciprocally rotated in the radial direction about the axes 15e attached to the holder 14, and the axes 15e are slid in the slits 20 to make it possible to adjust positions where the axes 15e moves while being guided by the slits 20 and are arranged. This adjustment is determined by an inclined shape of the slit 20. In addition, since the axes 15e of the stopper 15 can move in the slits 20 (guide grooves), even though the internal diameter of the second rod 12 slightly fluctuates, the stopper 15 can be normally operated.

In addition, when the pair of stopper separately arranged in the space S2 of the holder 14 are arranged in the second rod 12 together with the holder 14, both the ends of the coil spring 16 in a compressed state are locked to the facing locking projections 15f of the pair of stopper 15, and the lower end portion of the first rod 11 and the holder 14 are arranged together with each other while being inserted into predetermined positions in the second rod 12. FIG. 5 shows a state in which the rod fixing device 10 is arranged in the second rod 12 by the manner described above. The coil spring 16 mentioned here is arranged in a state in which the coil spring 16 is substantially orthogonal to the central axis line of the first rod 11.

An operation in which the fixing device 10 causes the first rod 11 to move to a upward/downward position, restrains the first rod 11 at the moved position, and keeps the first rod 11 at the position will be described below with reference to FIGS. 15A to 15C.

FIG. 15A shows a state in which the first rod 11 is moved and kept at the moved position, i.e., a locking state. In this state, the pair of stoppers 15 rotate about the axes (positioning pins) 15e by a spring force of the coil spring 16 having both the ends locked to the facing locking projections 15f, respectively, and a part of the brake member 22 attached to the contacting surface portion 15c is pressed against the inner circumferential surface 12a of the first rod 12. In this manner, the brake member 22 attached to the contacting surface portion 15c of the stopper 15 generates a fixing frictional force between the brake member 22 and the second rod 12, and the fixing frictional force can suppress the first rod 11 from moving with respect to the second rod 12. Thus, the fixing frictional force generated by the brake member 22 here is preferably set to be a force substantially equal to the weight on the first rod 11 side or slightly larger than the weight. In addition, in this locking state, the axis 15e of the stopper 15 is arranged at a substantially middle position in the longitudinal direction of the slit 20.

FIG. 15B shows a state in which an upward force is applied to the first rod 11 side. When the upward force is applied to the first rod 11 side in the state shown in FIG. 15A, the stopper 15 rotates about the axis 15e on a side on which the contacting surface portion 15c of the stopper 15 comes away from the inner circumferential surface 12a of the second rod 12 by resistance caused by the fixing frictional force of the brake member 22, and the brake member 22 comes away from the inner circumferential surface 12a of the second rod 12 to attenuate the fixing frictional force. When the stopper 15 rotates, the axis 15e assists the rotation of the stopper 15 with respect to the holder 14. When the axis 15e moves, the intermediate part of the coil spring 16, as shown in FIG. 5, is bent upward to assist the movement of the axis 15e. In the state in which the fixing frictional force is attenuated, the first rod 11 side is lift up, and the first rod 11 can be moved upward with a force substantially equal to the weight (when an installation is present on the first rod 11 side, weights of the first rod 11 and the installation) on the first rod 11 side. Note that, when a straight-bar-like core material which can be vertically bent, deformed, and curved is disposed in a cavity of the coil spring 16 in advance, when the coil spring 16 is bent, the coil spring 16 can be inductively deformed such that the bending deformation has a curved shape which is supposed in advance.

FIG. 15C shows a state in which a downward force is applied to the first rod 11 side. When the downward force is applied to the first rod 11 side in the state in FIG. 15A, the stopper 15 rotates about the axis 15e to a side to which the contacting surface portion 15c of the stopper 15 comes close with a fixing frictional force of the brake member 22. The brake member 22 comes into contact with the inner circumferential surface 12a of the second rod 12 to increase the fixing frictional force. Although the first rod 11 side is pressed down in the state in which the fixing frictional force increases, in the pressed-down state, the weight (when an installation is present on the first rod 11 side, gravity of the first rod 11 and the installation) on the first rod 11 side is added, and the first rod 11 can be moved downward with a light force. In addition, when the stopper 15 rotates, the axis 15e, as shown in FIG. 15C, moves in the slit 20 toward the central axis of the second long 12 to assist the rotation of the stopper 15 with respect to the holder 14.

Thus, in the rod fixing device 10 according to the embodiment, when the fixing frictional force is set to a force substantially equal to the weight on the first rod 11 side or slightly larger than the weight, the first rod 11 side is suppressed from moving with the fixing frictional force at ordinary times, and the locking state can be kept.

When an upward force is applied to the first rod 11 in the locking state, the fixing frictional force is attenuated to make it possible to move the first rod 11 side upward with a force substantially equal to the weight on the first rod 11 side. In contrast to this, a downward force is applied to the first rod 11, the first rod 11 can be moved downward with a force substantially equal to the fixing frictional force. In this manner, even though the moving direction of the first rod 11 is an upward direction or a downward direction, the first rod 11 can be operated with substantially the same magnitude of force, uncomfortable feeling in an operation of moving the first rod 11 upward or downward can be eliminated.

One pair of stoppers 15 are arranged at positions substantially symmetrical to the axial line of the second rod 12, and the coil spring 16 serving as an elastic member is locked to the locking projections 15f of the pair of stoppers 15 to arrange the coil spring 16 commonly to the stopper 15. Thus, the fixing frictional forces of the stoppers 15 are horizontally equally applied to the second rod 12, and the first rod 11 is stably suppressed from moving with respect to the second rod 12. Furthermore, also in the operation of moving the first rod 11 upward or downward, the pair of stoppers 15 come into contact with the inner circumferential surface 12a of the second rod 12, and, in the state in which the first rod 11 is held on the axial center, the upward/downward movement can be guided, so that the movement is stable. In addition, since the coil spring 16 serving as an elastic member is used for the pair of stoppers 15, the invention can achieve without increasing the number of parts.

The slits 20 serving as grooves are formed in the holder 14, and the axes 15e serving as positioning pins are slidably and rotatably fitted in the stoppers 15. Since the positions of the rotation centers of the stoppers 15 can be moved and adjusted in the radial direction of the second rod 12 by fitting between the slits 20 and the axes 15e, when the shapes of the slits 20 are set, in the locking state of the stoppers 15 to the second rod 12 at ordinary times (locking state) and when the first rod 11 is moved upward or downward, an attenuation of the fixing frictional force can be easily adjusted. As the axes 15e and the slits 20, in contrast to the embodiment, the axes 15e may be arranged on the holder 14 side, and the slits 20 may be formed on the stopper 15 side.

Since the shoulder portions 15d of the stoppers 15 facing the top surface of the space of the second rod 12 and the holder 14 are formed into convex curved shapes, the stoppers 15 for the second rod 12 and the holder 14 can be smoothly rotated in the radial direction of the second rod 12.

The present invention can be variously changed without departing from the spirit and scope of the invention, and the present invention includes the various changes, as a matter of course.

REFERENCE NUMERALS 10 rod fixing device
11 first rod (movable-side member)
12 second rod (fixed-side member)
12a inner circumferential surface
13 locking mechanism
14 holder
14a disk-like portion
14b concave portion
14c annular concave groove
14d vertical portion
14da, 14db vertical leg
15 stopper
15A main body portion
15a upper surface portion
15b side surface portion
15c contacting surface portion
15d shoulder portion
15e axis (positioning pin)
15f locking projection
16 coil spring
17 bracket
17a disk-like portion
17b upper-side tube-like portion
17c lower-side tube-like portion
17d shaft portion
18 tapping screw
19 attaching hole
20 slit (guide groove)
21 attaching hole
22 brake member
22a tapered portion
100 makeup mirror stand
101 telescopic rod unit
102 makeup mirror
103 installation table
S1 space
S2 space

What is claimed is:

1. A rod fixing device suppressing a rod from unexpectedly moving, comprising:
a first rod;
a cylindrical second rod into which the first rod is inserted and which holds the first rod such that the first rod can be reciprocally moved in axial directions; and
a locking mechanism which moves together with the first rod in the axial directions in the second rod, wherein the locking mechanism includes
at least one stopper having a contacting surface portion capable of coming into contact with an inner circumferential surface of the second rod,
a holder which is arranged in the second rod such that the holder can be moved together with the first rod and which rotatably holds the stopper in such a way that the contacting surface portion is capable of coming into contact with the inner circumferential surface of the second rod, and
an elastic member which gives to the stopper an elastic force for generating a fixing frictional force between the first rod and the second rod by causing the contacting surface portion of the stopper to come into contact with the inner circumferential surface of the second rod,
the stopper, when the first rod moves to one side in the axial directions, is rotated such that the contacting surface portion comes away from the inner circumferential surface of the second rod and, when the first rod moves to the other side in the axial directions, is moved against the fixing frictional force.

2. The rod fixing device according to claim 1, wherein as the stopper, one pair of stoppers are arranged at positions almost symmetrical to the elastic member.

3. The rod fixing device according to claim 1, wherein a positioning pin is disposed on one of the holder and the stopper, and a guide groove in which the positioning pin is engaged with the other of the holder and the stopper such that the positioning pin can be slid in the radial direction of the second rod.

4. The rod fixing device according to claim 1, wherein a shoulder portion of the stopper facing the second rod is formed in a convex curved shape.

5. The rod fixing device according to claim 1, wherein the stopper has the contacting surface portion to which a brake member is attached.

6. The rod fixing device according to claim 1, wherein the holder is attached to the first rod through a bracket.

7. A telescopic rod unit comprising:
the rod fixing device according to claim 1;
a movable-side member integrated with the first rod; and
a fixed-side member integrated with the second rod.

8. The telescopic rod unit according to claim 7, wherein the movable-side member is a makeup mirror and the fixed-side member is an installation table.

9. A rod fixing device suppressing a first rod from unexpectedly moving within a second rod, comprising:
a holder configured to be held in the first rod;
a pair of stoppers held by said holder;
an elastic member placed between said pair of stoppers and configured to bias said pair of stoppers away from each other; and
wherein each of said pair of stoppers have a shoulder portion and a brake member separated by a rotation axis, wherein said pair of stoppers are each held by said holder and configured to permit rotation relative to said holder about the rotation axis and movement away from and towards each other,
whereby upon moving the first rod away from the second rod said pair of stoppers each rotate about the rotation axis moving the brake member away from an inner surface of the second rod attenuating a friction force and upon moving the first rod towards the second rod said pair of stoppers each rotate about the rotation axis moving the brake member towards the inner surface of the second rod.

\* \* \* \* \*